United States Patent [19]

Stedman et al.

[11] Patent Number: 5,202,195
[45] Date of Patent: Apr. 13, 1993

[54] METHOD OF AND ARRANGEMENT FOR REPLENISHING HYDROGEN CONSUMED BY A FUEL CELL DEVICE

[75] Inventors: James K. Stedman; John C. Trocciola, both of Glastonbury, Conn.

[73] Assignee: International Fuel Cells Corporation, South Windsor, Conn.

[21] Appl. No.: 628,059

[22] Filed: Dec. 14, 1990

[51] Int. Cl.$^5$ .......................... H01M 8/04; H01M 8/06
[52] U.S. Cl. .................................. 429/17; 429/19; 429/20; 429/26
[58] Field of Search .................. 429/13, 17, 20, 25, 429/19, 26

[56] References Cited

U.S. PATENT DOCUMENTS

| | | | |
|---|---|---|---|
| 3,133,837 | 5/1964 | Eidensohn | 429/25 |
| 3,787,186 | 1/1974 | Geres | 423/657 |
| 4,362,789 | 12/1982 | Dighe | 429/17 |
| 4,537,839 | 8/1985 | Cameron | 429/26 |
| 4,539,267 | 9/1985 | Sederquist | 429/17 |
| 4,722,873 | 2/1988 | Matsumura | 429/24 |
| 4,855,192 | 8/1989 | Grasso | 429/20 |
| 4,943,493 | 7/1990 | Vartanian | 429/20 |
| 4,994,331 | 2/1991 | Cohen | 429/17 |

Primary Examiner—Anthony McFarlane
Attorney, Agent, or Firm—Peter R. Ruzek

[57] ABSTRACT

An arrangement for replenishing hydrogen consumed in a fuel cell device includes a reaction vessel that contains a quantity of a material that releases hydrogen on contact with water in a highly exothermic reaction. A hydrogen-containing gaseous medium is passed through the material quantity under conditions resulting in removal of heat from the material quantity by convection at a heat removal rate sufficient to maintain a temperature differential between an inlet portion and an outlet portion of the reaction vessel below a predetermined level. This includes recirculating a portion of the gaseous medium from the outlet portion to the inlet portion and cooling at least the recirculated portion. Water vapor is added to the recirculated gaseous medium portion at a rate commensurate with that at which hydrogen is being consumed in the fuel cell device for such added water vapor to exothermically react with the solid material, whereas the remainder of the gaseous medium is supplied from the outlet portion to the fuel cell device.

6 Claims, 1 Drawing Sheet

METHOD OF AND ARRANGEMENT FOR REPLENISHING HYDROGEN CONSUMED BY A FUEL CELL DEVICE

DESCRIPTION

1. Technical Field

The present invention relates generally to fuel cell devices, and more particularly to sources of hydrogen for use as fuel in fuel cell devices and to a method of and an arrangement for making replenishment amounts of hydrogen commensurate to those consumed by the fuel cell devices available for consumption by such devices.

2. Background Art

There are already known various constructions of fuel cell devices, such as fuel cells, fuel cell groups or stacks, and fuel cell power plants, among them such utilizing hydrogen as the fuel for the respective fuel cell device. As is well known, a chemical reaction takes place in the fuel cell device of this type between hydrogen and oxygen, resulting in the formation of water as the reaction product, with attendant desired generation of electricity and incidental release of thermal energy that typically manifests itself in sensible heat that constitutes waste heat as far as the fuel cell device is concerned and must be removed from such device for the latter to operate properly. During the above reaction, hydrogen is consumed by the fuel cell (and, incidentally, so is oxygen, but the consumption of oxygen need not be addressed here beyond stating that it occurs) and, for the fuel cell device to be able to continue its operation, the thus consumed amount must be replenished at a rate commensurate to that at which hydrogen is being consumed.

In some fuel cell applications, it is possible and sometimes even advantageous or necessary to use, as a source of the replenishment hydrogen amounts, hydrogen that is stored, as such or in combination with inert substances, in its liquid or gaseous state, in tanks or similar containers. On the other hand, many other fuel cell applications would benefit from the use of hydrogen derived from an alternative hydrogen source that stores the hydrogen in other than its compressed gaseous or liquid form, that is in the form of a chemical compound from which the required hydrogen can be easily released. This is particularly true of underwater and similar applications where the amount of available space is limited or at a premium, or where the total weight of the hydrogen source is to be kept to a minimum, so that the higher volumetric energy density (kilowatthours of produced electric energy per cubic foot of space occupied by the hydrogen source) of such alternative hydrogen source as compared to that of the traditional hydrogen sources is of a considerable importance.

In this respect, it has been previously proposed to use the reaction of a metallic chemical hydride with water to release hydrogen. The water required for this reaction to take place is typically supplied to the metallic chemical hydride in its liquid form, but it has also been proposed to supply such water to the metallic chemical hydride as water vapor that is diffused into a bed of the metallic chemical hydride whereas the product hydrogen diffuses off from the bed and is captured for immediate or eventual use.

The reaction of water with the respective metallic chemical hydride is highly exothermic, that is, a considerable amount of heat is liberated in the course of this reaction. This excess heat produced in the course of the water/hydride reaction must be removed from the reactant bed. While some of this heat is removed from the reactant bed by convection in the form of a sensible heat of the discharged hydrogen, it is only a minute proportion of total and the bulk of such heat must be conducted through the reactant bed to the wall of the reaction vessel from where it must be removed to avoid overheating of the reactant bed. Inasmuch as the heat conductivity of the material of the reactant bed is not very high, the temperature of the reactant bed will be relatively high, at least at regions remote from the walls of the reaction vessel, and this may adversely affect the efficiency of the reaction taking place in the reaction vessel and/or require special materials that are stable at high temperatures for the construction of the reaction vessel. By the same token, a considerable temperature differential exists between the temperature of the water vapor carrying hydrogen entering, and that of the substantially dry hydrogen leaving, the reaction vessel. Thus, the dry hydrogen is supplied to the anode side of the fuel cell at a temperature which may have a deleterious effect on the performance of the fuel cell or even cause its premature deterioration or destruction. Even though this latter problem could be minimized or eliminated by cooling the dry hydrogen before it reaches the fuel cell, this would still not take care of the problem of overheating of the reaction bed. Therefore, this system design which utilizes diffusion of water vapor for water addition and primarily heat conduction through the bed for heat removal limits the size and use of the chemical hydrogen sources of this kind to fuel cell devices with relatively low power levels (i.e., less than one kW).

The situation is not much better, as far as the problems of reactant bed overheating and excessive dry hydrogen temperature are concerned, in a modification of the above approach for providing replenishment hydrogen fuel for consumption in a fuel cell that is employed in a fuel cell system disclosed in the U.S. Pat. No. 3,133,837. In this system, the water vapor required for releasing the replenishment hydrogen is carried to a reaction vessel containing an amount of a metallic chemical hydride, such as calcium hydride, magnesium hydride, sodium hydride, potassium hydride, or lithium hydride, as a part of a gaseous medium that is exhausted from the anode side of a fuel cell and that predominantly consists of hydrogen which, however, is charged with the water vapor that it has picked up during its flow along the anode from the product water resulting from the reaction taking place in the fuel cell. In the reaction vessel, the water vapor carrying hydrogen comes into contact with the metallic chemical hydride whereby the entrained water vapor reacts with the metallic chemical hydride, resulting in the formation of a metallic hydroxide and release of hydrogen which is then conducted, together with the original carrier hydrogen that has passed through the reactant bed unchanged, back to the anode side of the fuel cell.

Even though the use of a hydrogen/water vapor mixture as proposed in the above patent, rather than of water vapor alone, increases the amount of gas that comes into contact with the metallic chemical hydride, and thus also increases the amount of heat convectively removed from the solid material contained in the reaction vessel by being carried out of the reaction vessel by the hydrogen exiting the same, the beneficial effect of this expedient on the average temperature of, and on the temperature distribution in, the solid material present in the reaction vessel is limited at best, and the temperature of the exiting hydrogen is still at an unacceptably high level.

This is primarily attributable to the fact that the amount of water vapor contained in the hydrogen supplied to the reaction vessel is determined by the operating conditions encountered in the fuel cell, such as the temperature and the dwell time of hydrogen at the anode side of the fuel cell. These parameters have to be optimized to assure proper operation of the fuel cell and, consequently, cannot be varied, except within very narrow limits, to modify the operating conditions in the metallic chemical hydride reaction vessel. As a matter of fact, the above patent discloses that the rate of flow of hydrogen in the closed circuit between the anode side of the fuel cell and the metallic chemical hydride reaction vessel must be controlled in dependence on the hydrogen pressure in the circuit, thus limiting the amount of hydrogen flow past the fuel cell anode to a level at which no excessive drying out of the anode takes place, that is to the level commensurate to that at which water is generated, and thus at which hydrogen is consumed, at the anode side of the fuel cell. As a result, the operating conditions encountered at the reaction vessel are far from ideal and this, in turn, again limits the use of the approach presented in the above patent to relatively low power fuel cell applications.

Accordingly, it is a general object of the present invention to avoid the disadvantages of the prior art.

More particularly, it is an object of the present invention to provide an arrangement for replenishing the amount of hydrogen furnished to a fuel cell from a reaction of water vapor with a metallic chemical hydride commensurately with the rate of hydrogen consumption in the fuel cell, which arrangement does not possess the disadvantages of the known arrangements of this kind.

Still another object of the present invention is so to develop the arrangement of the type here under consideration as to improve the convective cooling of the metallic chemical hydride and to reduce the temperature of the hydrogen exiting from the reaction vessel containing the metallic chemical hydride.

It is yet another object of the present invention to design the arrangement of the above type in such a manner as to be relatively simple in construction, inexpensive to manufacture, easy to use, and yet reliable in operation.

A concomitant object of the present invention is to devise a method of replenishing the amount of hydrogen furnished to a fuel cell from a reaction of water vapor with a metallic chemical hydride commensurately with the rate of hydrogen consumption in the fuel cell, which method would improve the temperature of and temperature distribution in the metallic chemical hydride reactant bed.

DISCLOSURE OF THE INVENTION

In keeping with these objects and others which will become apparent hereafter, one feature of the present invention resides in a method of replenishing hydrogen consumed in a fuel cell device, which method includes the steps of confining a quantity of a material that releases hydrogen on contact with water in a highly exothermic reaction in an enclosed space having an inlet portion and an outlet portion and passing a hydrogen-containing gaseous medium through the material quantity under conditions resulting in removal of heat from the material quantity by convection at a heat removal rate sufficient to maintain a temperature differential between the inlet portion and the outlet portion below a predetermined level. According to the invention, a portion of the gaseous medium is recirculated from the outlet portion to the inlet portion at a predetermined volumetric rate, and at least this recirculated portion is being cooled to a predetermined temperature. In further accord with the present invention, water vapor is being added to the recirculated portion at an addition rate commensurate with a consumption rate at which hydrogen is being consumed in the fuel cell device for such added water vapor to exothermically react with the solid material, while the remainder of the gaseous medium from the outlet portion is supplied to the fuel cell device. In accordance with another aspect of the present invention, there is also provided an arrangement constructed to perform the above method.

BRIEF DESCRIPTION OF THE DRAWING

The present invention will be described in more detail below with reference to the accompanying drawing in which.

BEST MODE FOR CARRYING OUT THE INVENTION

Figure 1:
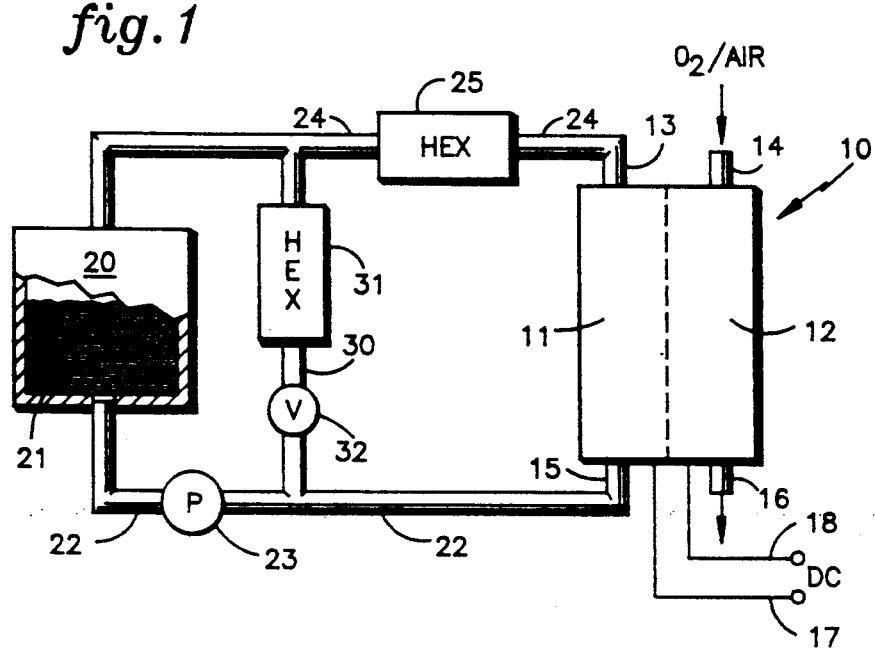
FIG. 1 is a somewhat simplified diagrammatic view of a fuel cell hydrogen replenishment arrangement of the present invention.

Referring now to the drawing in detail, and first to FIG. 1 thereof, it may be seen that the reference numeral 10 has been used therein to identify a fuel cell device. The fuel cell device 10 is of any known construction that need not be explained here in detail. Suffice it to say that the fuel cell device 10 has an anode side 11 and a cathode side 12, that hydrogen is being supplied to the anode side 11 through a hydrogen input conduit 13, and that oxygen as such, or as a constituent of air, is being supplied to the cathode side 12 through an oxygen input conduit 14. In addition, one output conduit 15 is shown to communicate with the anode side 11, and another output conduit 16 is shown to communicate with the cathode side 12. In the arrangement illustrated in FIG. 1, the one output conduit 15 serves to conduct a gaseous hydrogen medium discharged from the anode side 11, whereas the other output conduit 16 serves as a discharge conduit for either purging the cathode side 12 or discharging oxygen-deprived air from the cathode side 12. It is to be understood, however, that the other outlet conduit 16 could be dispensed with if only pure oxygen were supplied to the cathode side 12. For the sake of completeness, electric leads 17 and 18 are shown to indicate that the fuel cell device 10 generates electric power when in operation.

The fuel cell device 10 of the type described so far may consist of as little as a single fuel cell, but it usually includes a considerable number of individual fuel cells that are assembled and interconnected with one another and with auxiliary equipment to form fuel cell groups, stacks and/or the fuel cell portion of a complete fuel cell power plant. Consequently, the fuel cell device 10, as that term is being used herein, embraces any of the possibilities mentioned above; however, for the sake of clarity and convenience, the fuel cell device 10 will be discussed below as if it were constituted by only one fuel cell.

As is well known, the mechanism that results in the generation of electric current that ultimately flows through the leads 17 and 18 is a usually catalytically enhanced electrochemical reaction during which hydrogen supplied to the anode of each fuel cell 10 is electrochemically combined with oxygen supplied to the cathode side 12 of such fuel cell 10 to form product water, accompanied by release of electrons that create an electrical potential difference between the anode and the cathode of the fuel cell 10. Depending on the construction of the fuel cell 10, the product water can be formed at the anode side 11 or at the cathode side 12. For instance, if the fuel cell 10 contains an alkaline electrolyte, such as potassium hydroxide, the product water is electrochemically formed at the anode side 11. On the other hand, if the fuel cell 10 contains an acid electrolyte, such as phosphoric acid, or a sulfonated fluoropolymer, such as that sometimes referred to as SPE TM, the product water is formed at the cathode side 12. However, regardless of where the product water is actually formed, it may appear, or be caused to appear, at the respectively other side 12 or 11. Depending on the temperature and pressure conditions prevailing in the fuel cell 10, the product water may be present at the respective side 11 or 12 either in its liquid form or, in a hydrogen flow-through system of the type illustrated in FIG. 1, as water vapor that is evaporated into or otherwise enters the hydrogen flowing, in the construction depicted in FIG. 1 and forming the basis of the following discussion, through the anode side 11 and along the anode from the hydrogen input conduit 13 to the hydrogen output conduit 15.

The volumetric flow rate at which the hydrogen is caused to pass through the anode side 11 is determined by the operating conditions encountered in the fuel cell 10, that is, basically by the rate at which hydrogen is consumed and product water is formed at the anode side 11 of the fuel cell 10, which consumption rate, in turn, is related to the rate at which electric current is withdrawn from the fuel cell 10 through the electric leads 17 and 18, and further by the need to keep the rate at which the product water is removed from the anode side 11 commensurate with the rate at which the product water is produced, so as to avoid either water flooding or excessive drying out of the anode side 11. Thus, there is an upper limit on the maximum rate at which the hydrogen can be passed through the anode side 11.

As mentioned before, the water vapor discharged from the anode side 11 of the fuel cell 10 is to be brought into contact with a metallic chemical hydride, such as calcium hydride ($CaH_2$). To achieve this, there is provided a reaction vessel 20 which contains a quantity or a reactant bed 21 of the metallic chemical hydride which is usually present in the internal space of the reaction vessel 21 in its particulate form, and a supply conduit 22 having a pump 23 interposed therein is being used to supply the water vapor containing (moist) hydrogen, which is discharged from the anode side 11 of the fuel cell 10 into the hydrogen output conduit 15, into the interior of the reaction vessel 20 and thus into the bed 21 where it becomes distributed throughout the bed 21 with the result that the water vapor contained in the moist hydrogen reacts with the metallic chemical hydride. For calcium hydride, this reaction can be represented as follows:

$$CaH_2 + 2 H_2O \text{ (vapor)} = Ca(OH)_2 + 2 H_2$$

It may be seen from the above that the calcium hydride is converted into calcium hydroxide, and a mol of hydrogen is released in the process for each mol of water vapor. The thus released hydrogen, together with the hydrogen that has been supplied into the reaction vessel 20 through the supply conduit 22, is then returned to the hydrogen input conduit 13, and thus to the anode side 11 of the fuel cell 10, through a return conduit 24 which, as illustrated, has a heat exchanger 25 interposed therein for the purpose of cooling such hydrogen to the desired hydrogen input temperature for the fuel cell 10.

As also mentioned before, the above reaction is highly exothermic. Consequently, and given the fact that the amount of hydrogen serving as a carrier for the water vapor from the fuel cell 10 is limited in the manner and for the reasons mentioned above, the amount of hydrogen that is either released from or passes through the reactant bed 21 would be so small in the arrangement as described so far that it would remove from the reactant bed 21 only a minute proportion of the thus liberated heat. This would have several disadvantageous consequences. For one, most of the liberated heat would have to be removed through the walls of the reaction vessel 20 in order to avoid overheating of the material of the reactant bed 21. This would complicate the construction of the vessel 20 by requiring that it be capable of such heat removal, for instance by being actively cooled. Even then, however, the problem of reactant bed material overheating would not be completely resolved. More particularly, in view of the relatively poor thermal conductivity of the reactant bed material, certain regions of the reactant bed 21, especially those remote from the walls of the reaction vessel 20, could still become overheated, despite sufficient reaction vessel cooling capacity. Another disadvantage would be that there would be a substantial temperature differential between the temperature of the moist hydrogen entering, and that of the dry hydrogen leaving, the interior of the reaction vessel 20, and especially the temperature of the dry hydrogen would be excessive, necessitating that the heat exchanger 25 be constructed in such a manner as to be able not only to remove a huge amount of heat from the dry hydrogen, but also to reduce its temperature to the level required at the hydrogen input 13 to the anode side 11.

To avoid these problems, it is proposed in accordance with the present invention to increase the rate of flow of a gaseous medium through the reactant bed 21 so as not only to increase the rate of heat removal by convection therefrom, but also to minimize the temperature differences between the various regions thereof and reduce the exit temperature of the dry hydrogen leaving the interior of the reaction vessel 20. This is achieved in the arrangement depicted in FIG. 1 by providing a recirculation conduit 30 communicating with the return conduit 24 for the dry hydrogen, on the one hand, and the supply conduit 22 for the moist hydrogen, on the other hand. As a result of the presence of the recirculation conduit 30, the pump 23 interposed in the supply conduit 22 draws not only the moist hydrogen from the output conduit 15 but also, through the recirculation conduit 30, a portion of the dry hydrogen from the return conduit 24, so that the volumetric rate at which the pump 23 forces the combined hydrogen amounts through the reactant bed 21 is increased as compared to that existing in the absence of the recirculation conduit 30. The flow-through cross-sectional area of the recirculation conduit 30, is preferably such that the amount of heat removed from the reactant bed 21 by convection is high enough to keep the temperature differential across the reactant bed 21 below a predetermined level even if the loading of the reactant bed 21 with water vapor is at its highest level for an extended period of time.

The approach presented above has several advantages. For one, as already mentioned above, the increase in the amount of the gaseous medium passing through the reactant bed 21 increases the ability of such medium to accept and convectively remove heat without excessive rise in its temperature; however, it also improves the penetration of the gaseous medium into the reactant bed 21 and distribution thereof to the individual particles of the material of the reactant bed 21 and this, in turn, minimizes if not eliminates the otherwise existing possibility of regional or local reactant bed material overheating and also assures more uniform distribution of the water vapor contained in the gaseous medium to the individual particles which, in turn, assures that all but an insignificant amount of the reactant bed material is ultimately exposed to the water vapor and participates in the hydrogen-releasing reaction. Furthermore, because of the improved penetration of the gaseous medium into the reactant bed 21, substantially all of the liberated heat goes directly from the individual particles into the gas stream so that the effect of the relatively low heat conductivity of the reactant bed material becomes insignificant. Also, because the total amount of the gaseous medium passing through the reactant bed 21 can be selected almost at will, the hydrogen generator part of the arrangement of the present invention can be scaled to any size required for the particular application. Another advantage of the increased gaseous medium volumetric flow through the reactant bed 21 is that the distribution of the water vapor that is contained in the gaseous medium to the individual particles or regions of the reactant bed 21 is improved as well so that, despite the lower concentration of water in the gaseous medium, the likelihood that some of the metallic chemical hydride would not be exposed to the water vapor is reduced to a minimum. Moreover, the lower water vapor concentration in the gaseous medium, which causes the progress of the metallic chemical hydride/water vapor reaction to be much more gradual than otherwise, in conjunction with the more efficient heat transfer from the reactant bed material to the gaseous medium and the resulting lower temperature the reactant bed material, not only makes the reaction more efficient but may also minimize the danger that caking of the reactant bed material and/or blocking of access to the metallic chemical hydride by previously formed metallic hydroxide would occur.

Turning back to FIG. 1 of the drawing, it may further be seen therein that a further heat exchanger 31 is provided, being interposed in the recirculation conduit 30. This heat exchanger 31 serves to cool the portion of the dry hydrogen that is being recirculated to the inlet portion of the reactant bed 21, preferably to substantially the same temperature as that of the moist hydrogen supplied from the hydrogen output conduit 15 of the fuel cell device 10. It will be appreciated that, without this cooling of the recirculated hydrogen portion, the average temperature of the reactant bed 21, and the exit temperature of the dry hydrogen, would rise over time, even though the temperature differential between the inlet and outlet portions of the reactant bed would remain the same or change only to a small degree. However, the same effect would also be achieved, as also contemplated herein, if the heat exchangers 25 and 31 were combined into a single one which then would be located upstream of the location at which the recirculation conduit 30 branches off the return conduit 24. In any event, the total amount of heat removed from the dry hydrogen by the two heat exchangers 25 and 31, or by the aforementioned combined heat exchanger, is the same, and the temperature differentials between the inlet and outlet temperatures thereof are smaller, rendering it possible to simplify the construction and increasing the efficiency of such heat exchangers.

FIG. 1 of the drawing also shows that a valve 32 is interposed in the recirculation conduit 32. This valve 32 serves to control the rate at which the dry hydrogen is recirculated through the recirculation conduit 30 to become a part of the gaseous medium being supplied by the pump 23 to the inlet portion of the reactant bed 21. The valve 32 may be permanently manually set to a predetermined value, or it may be adjusted, from time to time or continuously, to take into account the operating conditions under which the fuel cell device 10 operates. So, for instance, the flow-through cross-sectional area of the valve 32 can be adjusted in dependence on the amount of electric current drawn through the electric leads 17, which is a good measurement of the rate at which hydrogen is being consumed, and thus water vapor is being produced and entrained in the hydrogen, in the fuel cell device 10. In the alternative, the partial pressure of water vapor in the hydrogen that has exited the fuel cell device 10 through the output conduit 15 can be measured to determine the water amount therefrom, and this information can then be used to adjust the flow-through cross-sectional area of the valve 32. Yet, the adjustable valve 32 could be omitted altogether if it were not desired to control the amount of dry hydrogen flow through the recirculation conduit 30.

To give an example of how the arrangement illustrated in FIG. 1 of the drawing operate, let us first assume for the ease of explanation and understanding that the fuel cell device 10 is to consume a mol of hydrogen in a certain period of time. This means that a mol of water vapor is produced and included in the gaseous medium at the anode side 11 of the fuel cell 10 in the same time period. Now, let us assume further that 8 mols of gaseous medium are to pass through the anode side 11 to assure proper operation of the fuel cell device 10 without flooding or excessive drying thereof. This means that such 8 mols have to be returned to the anode side 10 through the return conduit 24 and the input conduit 13, with one mol being consumed in the fuel cell and the remaining 7 mols, together with the one mol of water vapor entrained therein, are discharged from the anode side 11 through the output conduit 15 and are caused by the pump 23 to flow through the supply conduit 22 toward and into the reactant bed 21 and through the latter. At the same time, the pump 23 causes, say, 24 mols of hydrogen to be recirculated from the return conduit 24 to the supply conduit 22 in the above time period, so that the gaseous medium entering the inlet portion of the reactant bed 21 includes 31 mols of hydrogen and one mol of entrained water vapor whereas that leaving the reactant bed 21 and thus the reaction vessel 20 consists of 32 mols of substantially dry hydrogen, of which 24 mols constitute the portion that is being recirculated, and the remaining 8 mols continue to flow through the remainder of the return conduit 24 to the input conduit 13 and ultimately into the anode side 11 of the fuel cell 10, thus satisfying the demand there.

Figure 2:
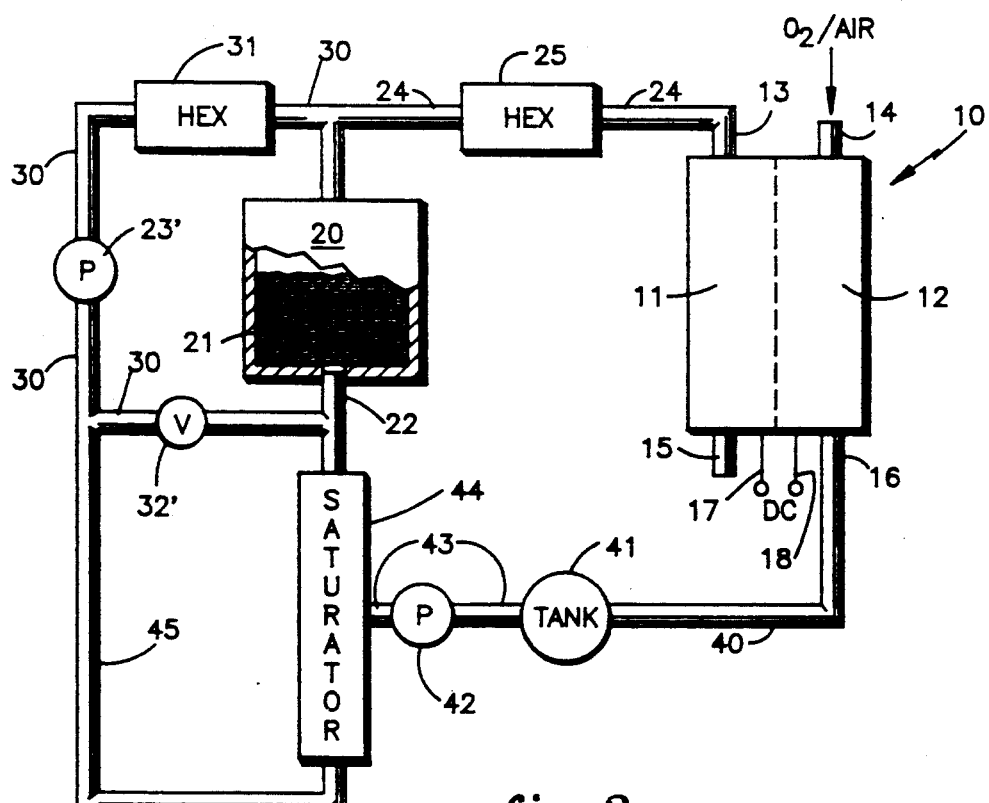
FIG. 2 is a view similar to that of FIG. 1 but displaying a modification of the arrangement of the present invention.

FIG. 2 of the drawing shows a modification of the above arrangement that is based on similar principles as above, so that the same reference numerals as before have been used therein to identify the same components, and corresponding reference numerals supplemented with a prime have been used to indicate components that are functionally similar to those used in the arrangement of FIG. 1. In this modified arrangement, however, the product water is discharged from the cathode side 12 of the fuel cell 10 via the output conduit 16 as a liquid, and is conveyed through a water supply conduit section 40 into a collection tank 41. A water pump 42, which is interposed in another water supply conduit section 43, then supplies water from the tank 41 through the section 43 to a saturator 44. If need be, the product water is rid, in any known manner, of substantially all oxygen contained therein before being supplied to the saturator 44.

This time, the recirculation conduit 30 includes a pump 23' which is shown to recirculate a portion of only the dry hydrogen from the outlet portion of the reaction vessel 20 to the gaseous medium supply conduit 22. However, a part of this recirculated dry hydrogen portion is diverted to a connecting conduit 45 which carries this diverted part to the saturator 44 where the dry hydrogen of this diverted part comes into contact with the liquid water and picks up moisture in the form of water vapor therefrom. The thus moistened hydrogen is then discharged from the saturator 44 into the gaseous medium supply conduit 22 where it joins the undiverted remainder of the dry hydrogen portion prior to being admitted into the inlet portion of the reactant bed 21.

It will be appreciated that, in this modified arrangement, steps must be taken to assure that the amount of water picked up by the dry hydrogen in the saturator 44 is commensurate to that produced in the fuel cell device 10. This may be achieved by controlling the flow rate of the dry hydrogen through the connecting conduit 45 and thus through the saturator 44. In the illustrated construction, this is achieved by controlling the flow-through cross-section of a valve 32' that is interposed in a section of the recirculation conduit 30 that bypasses the saturator 44. In the alternative, the same result could be achieved by metering the amount of water supplied from the tank 41 to the saturator 44, for instance by constructing and/or operating the pump 42 as a metering pump, or by inserting a metering valve in the water supply conduit section 43, or by controlling the temperature of the water admitted into and/or present in the saturator 44, thereby adjusting the partial water vapor pressure accordingly. In these latter two instances, the bypassing section of the recirculation conduit 30 and the valve 32' could be dispensed with, in which case all of the dry hydrogen portion flowing through the recirculation conduit 30 would continue its flow through the connecting conduit 4 and into the saturator 44.

In any event, the amount of water vapor that is present in the gaseous medium supplied to the inlet portion of the reactant bed 21 is once more only a small fraction of that which would be present if such medium were saturated with water vapor at the temperature at which it enters the input portion of the reactant bed 21, resulting in the same advantages as described above in conjunction with FIG. 1.

While the present invention has been illustrated and described as embodied in particular constructions of fuel cell device hydrogen replenishment systems, it will be appreciated that the present invention is not limited to these particular examples; rather, the scope of protection of the present invention is to be determined solely from the attached claims.

We claim:

1. An arrangement for replenishing hydrogen consumed in a fuel cell device, comprising
    means for confining in an enclosed space having an inlet portion and an outlet portion, a gas-permeable bed of a solid material that releases hydrogen on contact with water in an exothermic reaction;
    means for enriching a hydrogen-containing gaseous medium with water at a water addition rate commensurate with a consumption rate at which hydrogen is being consumed in the fuel cell device;
    means for passing the water-enriched hydrogen-containing gaseous medium through said bed from said inlet portion to said outlet portion of said enclosed space for the water contained in said water-enriched gaseous medium to exothermically react with said solid material and remove heat from said bed by convection;
    means for supplying said gaseous medium from said outlet portion to the fuel cell device at a supply rate at least equal to said consumption rate; and
    means for enhancing the removal of heat from said bed to achieve a heat removal rate sufficient to maintain a temperature differential between said inlet portion and said outlet portion below a level at which local overheating of said bed occurs, including
        means for recirculating a portion of said gaseous medium from said outlet portion to said inlet portion, and
        means for cooling at least said portion of said gaseous medium that is being recirculated by said recirculating means.

2. The arrangement as defined in claim 1, wherein said enriching means includes means for withdrawing water vapor carrying hydrogen gas from the fuel cell device at a withdrawal rate determined by operating conditions of the fuel cell device, and for combining such withdrawn gas with said recirculated gaseous medium portion upstream of said enclosed space.

3. The arrangement as defined in claim 1, wherein said enriching means includes means for intimately contacting said recirculated gaseous medium portion with water in its liquid state under conditions resulting in inclusion of water vapor in said recirculated gaseous medium portion at an inclusion rate commensurate with said consumption rate.

4. A method of replenishing hydrogen consumed in a fuel cell device, comprising the steps of
    confining a gas-permeable bed of a solid material that releases hydrogen on contact with water in an exothermic reaction in an enclosed space having an inlet portion and an outlet portion;
    enriching a hydrogen-containing gaseous medium with water at a water addition rate commensurate with a consumption rate at which hydrogen is being consumed in the fuel cell device;
    passing the water-enriched hydrogen-containing gaseous medium through said bed from the inlet portion to the outlet portion of said enclosed space for the water contained in said water-enriched gaseous medium to exothermically react with said solid material and remove heat from the bed by convection;

supplying said gaseous medium from the outlet portion to the fuel cell device at a supply rate at least equal to the consumption rate; and enhancing the removal of heat from the bed to achieve a heat removal rate sufficient to maintain a temperature differential between the inlet portion and the outlet portion below a level at which local overheating of said bed occurs, including recirculating a portion of the gaseous medium from the outlet portion to the inlet portion, and cooling at least that portion of the gaseous medium that is being recirculated.

5. The method as defined in claim 4, wherein said enriching step includes withdrawing water vapor carrying hydrogen gas from the fuel cell device at a withdrawal rate determined by operating conditions of the fuel cell device, and combining such withdrawn gas with the recirculated gaseous medium portion upstream of the enclosed space.

6. The method as defined in claim 1, wherein said enriching step includes intimately contacting the recirculated gaseous medium portion with water in its liquid state under conditions resulting in inclusion of water vapor in the recirculated gaseous medium portion at an inclusion rate commensurate with the consumption rate.

* * * * *